United States Patent [19]

Zander et al.

[11] Patent Number: 5,277,374

[45] Date of Patent: Jan. 11, 1994

[54] FILM-EJECTING CARTRIDGE

[75] Inventors: Dennis R. Zander, Penfield; Bradley S. Bush, Hilton, both of N.Y.

[73] Assignee: Eastman Kodak Company, Rochester, N.Y.

[21] Appl. No.: 859,800

[22] Filed: Mar. 30, 1992

[51] Int. Cl.[5] ............................................. G03B 17/26
[52] U.S. Cl. ................................................. 242/71
[58] Field of Search ............... 242/71, 71.1, 71.7, 71.9; 354/275, 206; 242/71.9; 354/275; 206/408, 409

[56] References Cited

U.S. PATENT DOCUMENTS

| | | | |
|---|---|---|---|
| 3,104,846 | 9/1963 | Ringle | 242/71.1 |
| 3,631,971 | 1/1972 | Rinkleit | 206/52 R |
| 3,771,687 | 11/1973 | Krtons | 220/31 |
| 4,176,938 | 12/1979 | Weiss et al. | 354/275 |
| 4,179,028 | 12/1979 | Stemme et al. | 206/316 |
| 4,221,479 | 9/1980 | Harvey | 354/275 |
| 4,223,852 | 9/1980 | Neuhold | 242/71.1 |
| 4,395,107 | 7/1983 | Lührig et al. | 242/71.1 X |
| 4,420,120 | 12/1983 | Raymond | 242/71.7 |
| 4,754,875 | 7/1988 | Rauffer et al. | 206/316 |
| 4,938,429 | 7/1990 | Robertson et al. | 242/71.1 |
| 4,948,063 | 8/1990 | Niedospial, Jr. | 242/71.1 |
| 4,962,401 | 10/1990 | Takahashi | 354/275 |
| 5,083,721 | 1/1992 | Okutsu et al. | 242/71.1 |
| 5,145,066 | 9/1992 | Clark et al. | 242/71.1 X |
| 5,174,519 | 12/1992 | Oi et al. | 354/275 X |

FOREIGN PATENT DOCUMENTS

| | | | |
|---|---|---|---|
| 2651407 | 5/1978 | Fed. Rep. of Germany | 354/275 |
| 60-57333 | 4/1985 | Japan | 354/275 |
| 1-316731 | 12/1989 | Japan | 354/275 |
| 2-67538 | 3/1990 | Japan | 354/275 |

Primary Examiner—Daniel P. Stodola
Assistant Examiner—John P. Darling
Attorney, Agent, or Firm—Roger A. Fields

[57] ABSTRACT

A film cartridge has ah interior spring that first engages the leader of a filmstrip as the leader is initially wound into the cartridge housing and then is distorted from its original shape by further movement of the leader into the housing. When a door connected to the cartridge housing is closed, the spring is maintained distorted in engagement with the leader, opening the door frees the spring, allowing the spring to propel the leader from the cartridge housing by recovering its original shape.

5 Claims, 5 Drawing Sheets

FILM-EJECTING CARTRIDGE

BACKGROUND OF THE INVENTION

1. Field of the invention

The invention relates generally to the field of photography, and in particular to film cartridges. More specifically, the invention relates to a film cartridge that is capable of propelling or thrusting a film leader from inside to outside the cartridge housing.

2. Description of the Prior Art

Commonly assigned, prior art U.S. Pat. No. 5,046,682, issued Sep. 10, 1991, discloses a film cartridge in which a film roll whose outermost convolution is a film leader is coiled about a spool rotationally supported inside the cartridge housing. A pair of flexible, independently rotatable flanges are coaxially arranged on the spool to radially confine the film leader within respective skirted peripheries of the flanges to prevent the leader from substantially contacting an interior wall of the cartridge housing. A stripper projecting from the interior wall is received between a leading end of the film leader and the next-inward convolution of the film roll to free the leader from the flanges and guide it into a lighttight passageway out of the cartidge housing responsive to rotation of the spool in a film unwinding direction. The stripper frees the film leader from the flanges by inducing the leader to flex the flanges away from each other at their skirted peripheries during unwinding rotation of the spool.

SUMMARY OF THE INVENTION

According to the invention, a film cartridge comprising a cartridge housing, and a filmstrip stored inside the cartridge housing, is characterized in that:

elastic means which recovers its original shape when released after being distorted is located inside the cartridge housing to engage the filmstrip for propelling the filmstrip from the housing by springing forward to recover its original shape when released after being distorted.

More particularly, a film cartridge comprising a cartridge housing, a spool rotationally supported inside the cartridge housing to wind a filmstrip including a film leader into the housing, and a door that opens to allow the film leader to exit the cartridge housing, is characterized in that:

elastic means which recovers its original shape when released after being distorted is secured to the cartridge housing, first to engage the film leader as the leader is initially moved into the cartridge housing when the filmstrip is wound into the housing and then to be distorted from its original shape by further movement of the leader into the housing, for propelling the film leader from the cartridge housing by springing forward to recover its original shape when released; and arresting means for holding the elastic means distorted is supported for movement to release the elastic means when the door is opened.

DETAILED DESCRIPTION OF THE PREFERRED EMBODIMENT

The invention is disclosed as being embodied preferably in a 35 mm film cartridge. Because the features of this type of film cartridge are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
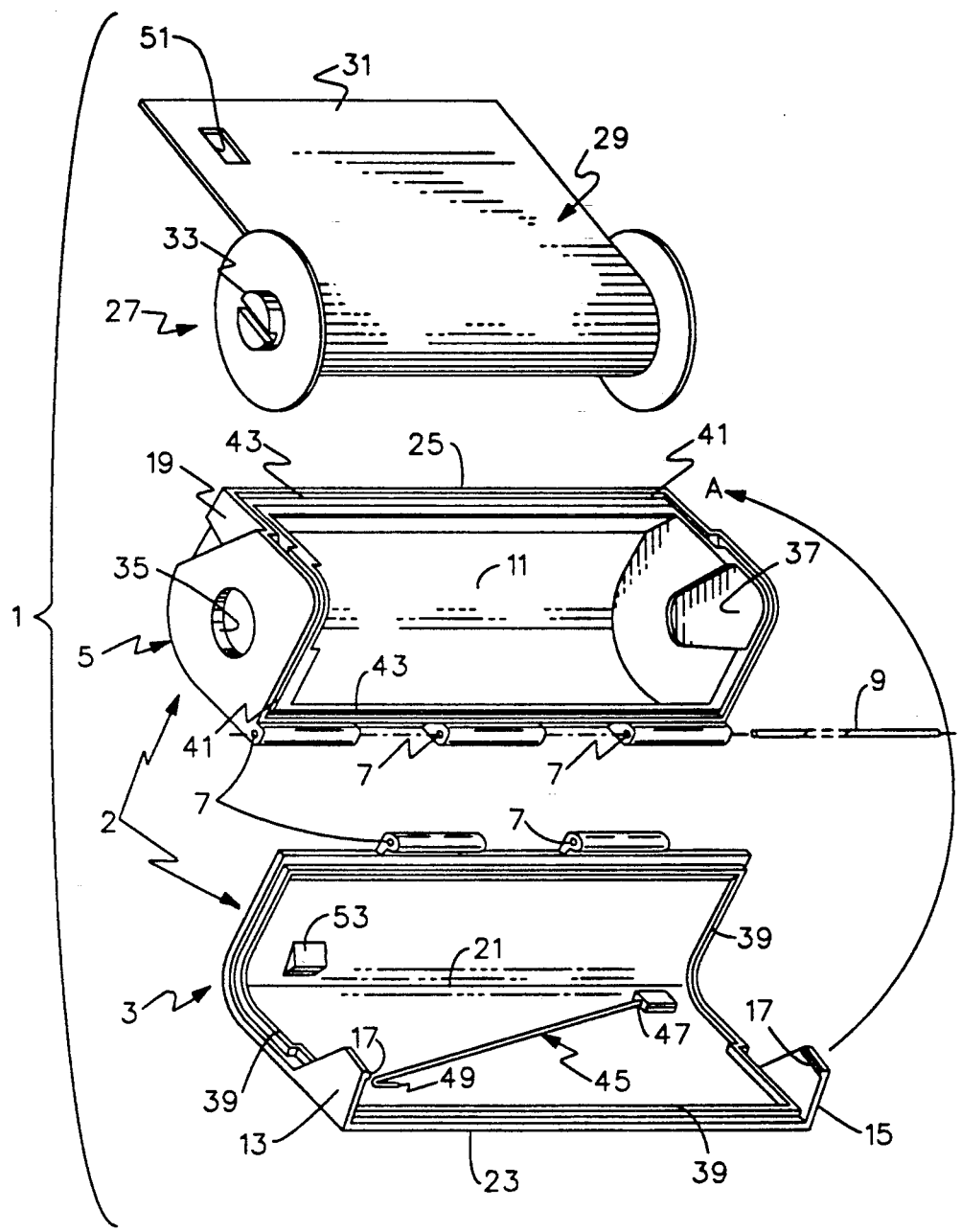
FIG. 1 is an exploded perspective view of a film-ejecting cartridge according to a preferred embodiment of the invention.
Figure 2:
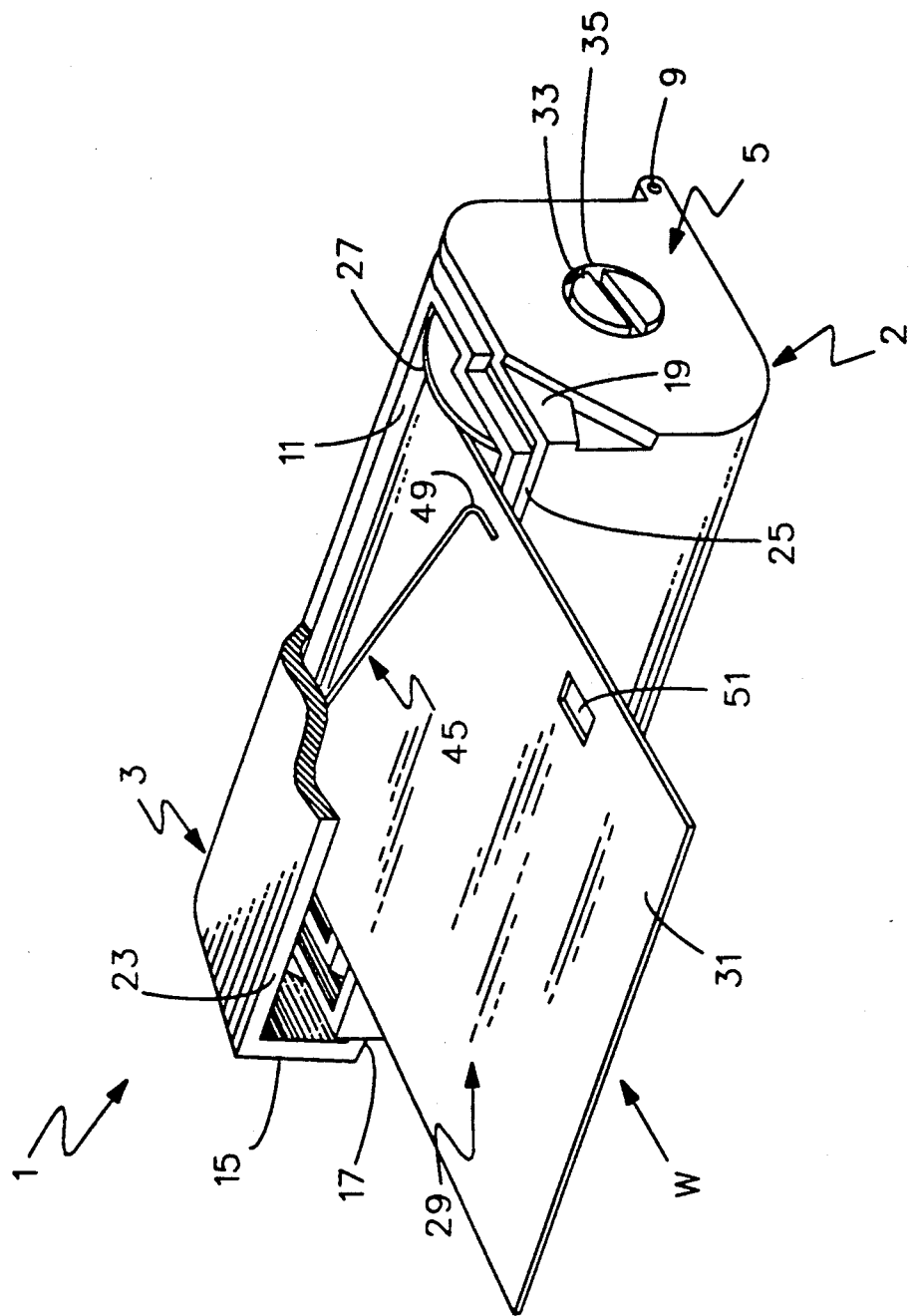
FIGS. 2, 3, and 4 are perspective views partly in section of the film-ejecting cartridge, depicting how a filmstrip including the film leader is wound into the cartridge housing.
Figure 3:
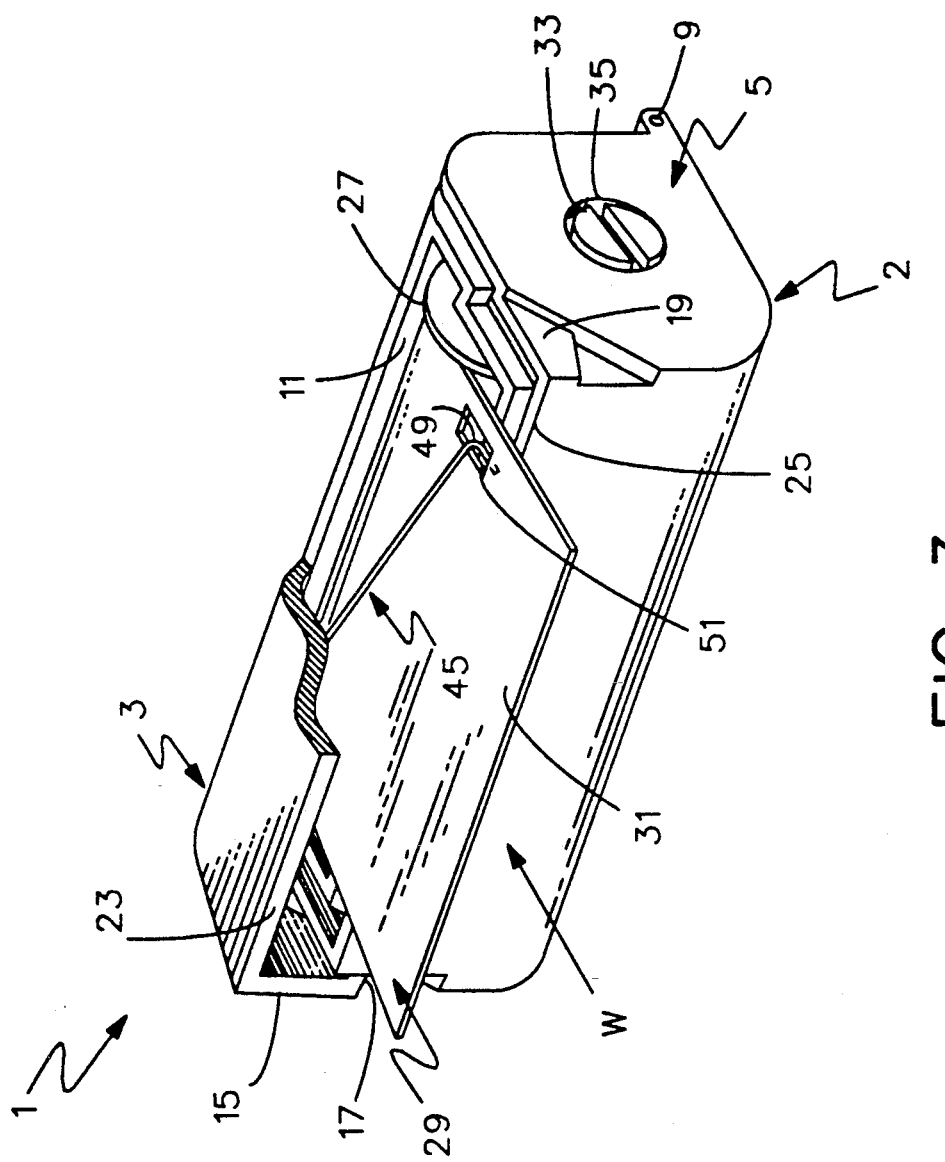

Referring now to the drawings, FIG. 1 shows a film-ejecting cartridge 1 having a cartridge housing 2 made of plastic material and comprising a pair of shell halves 3 and 5. Several coaxial holes 7 in the two shell halves receive a pivot pin 9 to connect the shell halves. When the shell halves 3 and 5 are joined or folded together as indicated by the arrow A, they enclose a film chamber 11.

The shell halve 3 includes an integral pair of latches or lugs 13 and 15, each one of which has an inwardly facing lip 17. See FIGS. 1 and 5. The respective lips 17 are shaped to releasably engage corresponding projections 19 on the shell halve 5 to hold the cartridge housing 2 closed. A line of weakness or crease-line 21 is cut on the inside of the shell halve 3 to effect an integral hinge which permits a certain portion of the shell halve between the crease-line and one end 23 of the shell halve to be easily lifted at that end slightly from an opposite end 25 of the shell halve 5, to allow film movement into and out of the film chamber 11. This is similar somewhat to the arrangement shown in prior art U.S. Pat. No. 4,962,401, issued Oct. 9, 1990. Alternatively, a door or pivotal lid can be provided as shown in prior art U.S. Pat. No. 3,631,971, issued Jan. 4, 1972. A conventional, flanged film spool 27 on which is wound a 35 mm filmstrip 29 including a film leader 31 is rotationally supported in the film chamber 11. One end or hub portion 33 of the spool 27 extends into a coaxial hole 35 in the shell halve 5 and another end or hub portion, not shown, is seated in a recess 37 in the shell halve to support the spool for rotation in film winding and unwinding directions. Although not shown, a removeable rubber plug can be placed in the coaxial hole 35 atop the hub portion 33 and a rubber gasket can be located around the coaxial hole on the inside of the shell halve 5 to serve as lighttight humidity seals for the film chamber 11.

A continuous edge of the shell halve 3 includes a coextensive tongue or rib 39 and a continuous edge of the shell halve 5 includes a coextensive groove or channel 41. See FIG. 1. When the shell halves 3 and 5 are joined together as indicated by the arrow A, the tongue 39 is seated in the groove 41. An example of a film cartridge with tongue and groove mating of two shell-like parts is shown in prior art U.S. Pat. No. 4,420,120, issued Dec. 13, 1983.

Compliant opaque material, such as a rubber gasket 43, is located in the bottom of the groove 41. The gasket 43 extends completely along the groove 41 to be compressed by the tongue 39 when the tongue is seated in the groove. Alternatively, instead of locating the gasket 43 in the groove 41, a modification of the tongue 39 can include a gasket tip, not shown, which is compressed when it is forced into the groove. In either instance, the gasket 43 or the gasket tip serves as a lighttight humidity seal for the film chamber 11.

According to the invention, shown in FIGS. 1-5, a normally straight wire spring 45 has one end 47 affixed to the inside of the shell halve 3 and an opposite hooked end 49 sized to be received in a perforation 51 in the film leader 31 to engage the leader. As is typical, the wire spring 45 will recover its original shape when released after being distorted.

Figure 4:
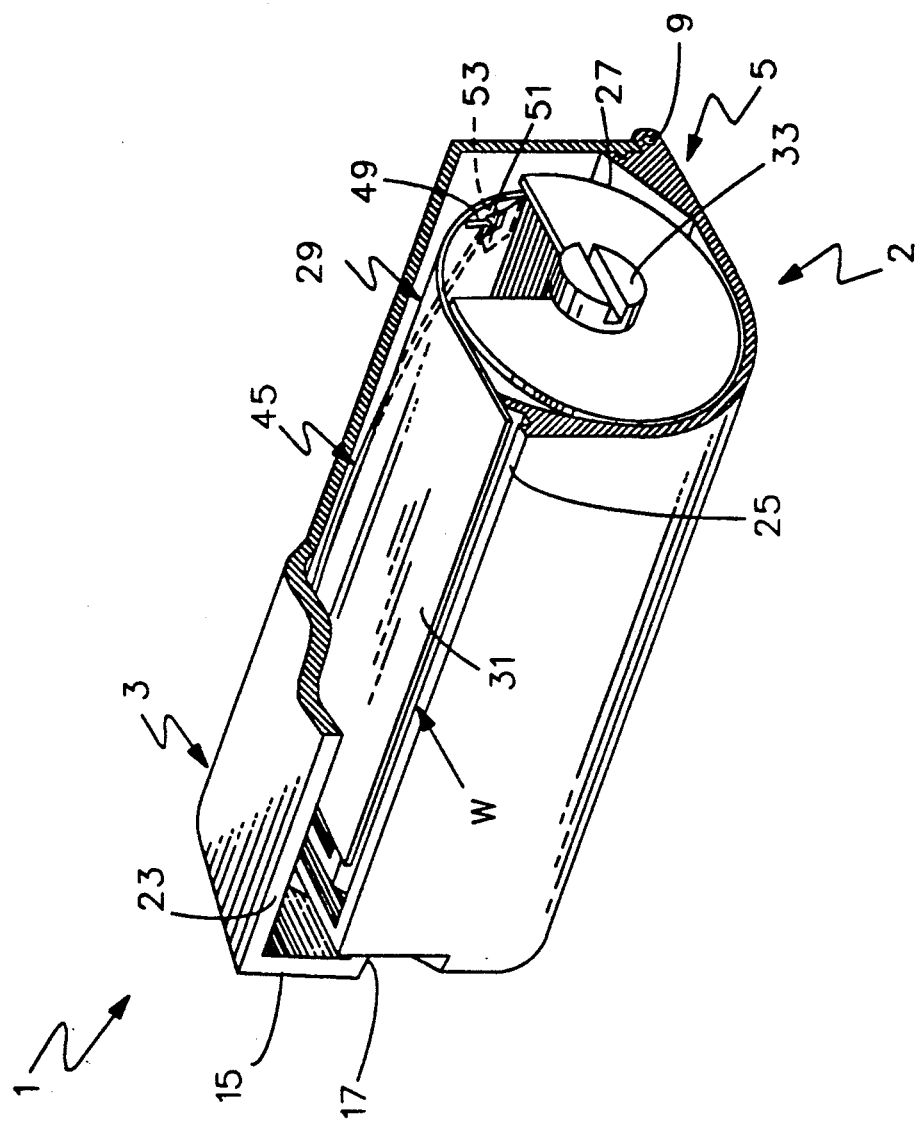
Figure 5:
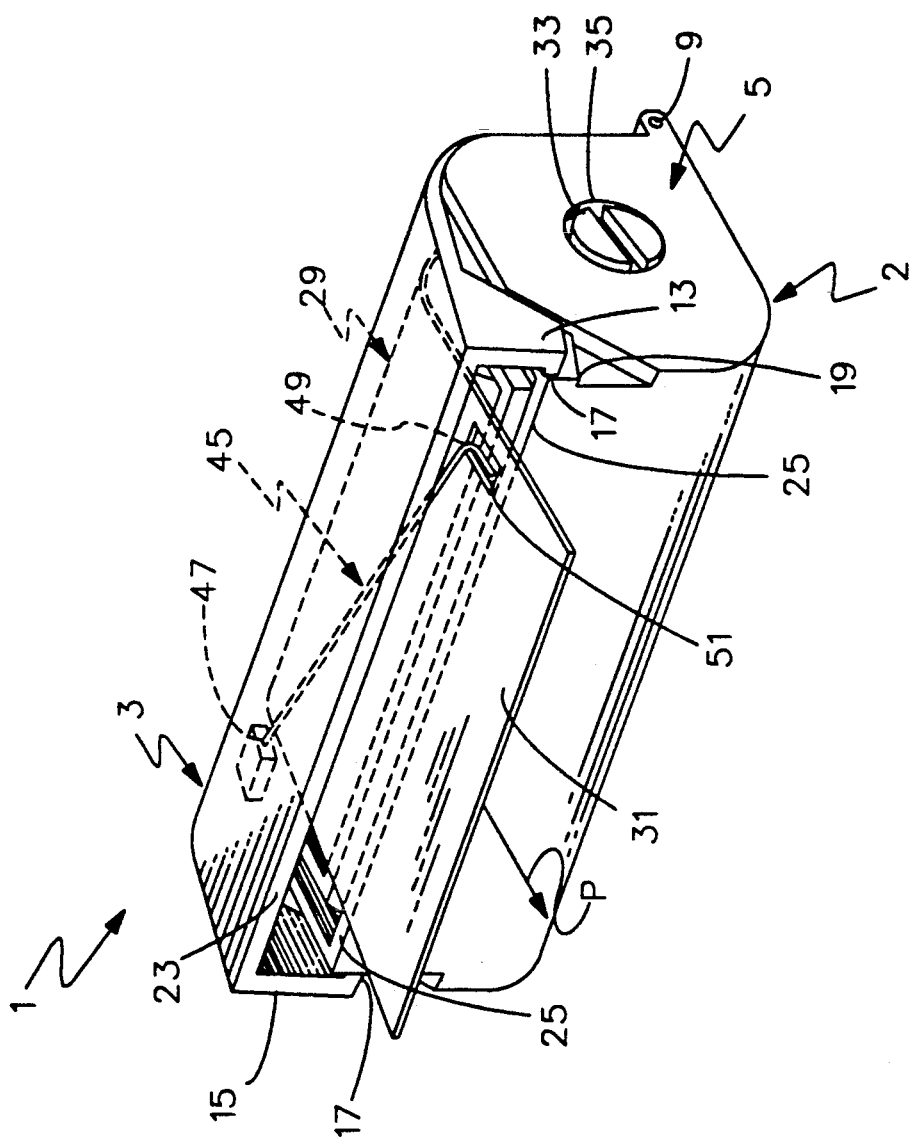
FIG. 5 is a perspective view of the film-ejecting cartridge, depicting how the film leader is propelled from inside to outside the cartridge housing responsive to opening a cartridge door.

To operate the film cartridge 1, the respective ends 23 and 25 of the two shell halves 3 and 5 are slightly separated and the filmstrip 29 is wound onto the spool 27. When the film leader 31 is initially moved into the cartridge housing 2 in a film ingress direction as indicated by the arrow W in FIGS. 2 and 3, the hooked end 49 of the wire spring 45 will drop into the perforation 51 in the leader to, engage the leader. Further movement of the leader 31 in the film ingress direction into the housing 2 distorts or pulls the wire spring 45 in the same direction as shown in FIG. 4 from its original shape in a relaxed position, until the wire spring is halted by abutment with a stop 53 on the inside of the shell halve 3. Closing the two shell halves 3 and 5 together to-.seat the tongue 39 in the groove 41 holds the leader 31 in place to, in turn, hold the wire spring 45 in a cocked or distorted position against the stop 53. If the shell halves 3 and 5 are then slightly separated at their respective ends 23 and 25 as shown in FIG. 5, the leader will be freed. This allows the wire spring 45 to snap forward from the cocked position to the relaxed position to recover its original shape, propelling the leader 31 from the cartridge housing 2 a certain limited extent in a film egress direction as indicated by the arrow P.

Once the film leader 31 is propelled outside the cartridge housing 2 by movement of the wire spring 45 from the cocked position to the relaxed position, the leader may be disengaged from the hooked end 49 of the wire spring simply by pulling the leader as indicated by the arrow P in FIG. 5. Alternatively, a bump, not shown, can be provided on the inside of the shell halve 3 to push the leader 31 off the hooked end 49 when the wire spring 45 resumes the relaxed position.

The invention has been described with reference to a preferred embodiment. However, it will be appreciated that variations and modifications can be effected within the ordinary skill in the art without departing from the scope of the invention. For example, other means in place of the two shell halves 3 and 5 in conjunction with the film leader 31 can serve to hold the wire spring 45 in the cocked position.

We claim:

1. A film cartridge comprising a cartridge housing, and a filmstrip stored inside said cartridge housing, is characterized in that:

propelling means including an elastic member capable of being distorted in a film ingress direction into said cartridge housing, and which recovers an original shape by springing movement in a film egress direction from the housing when released after being distorted, is located on said cartridge housing to engage said filmstrip for propelling the filmstrip from the housing solely by springing movement in the film egress direction to recover its original shape when released after being distorted in the film ingress direction.

2. A film cartridge comprising a cartridge housing, and a filmstrip including a film leader stored inside said cartridge housing, is characterized in that:

propelling means including an elastic member capable of being distorted in a film ingress direction into said cartridge housing, and which recovers an original shape by springing movement in a film egress direction from the housing when released after being distorted, is secured to said cartridge housing to engage said film leader for propelling the leader from the housing solely by springing movement in the film egress direction to recover its original shape when released after being distorted in the film ingress direction; and arresting means for holding said elastic means distorted in the film ingress direction is supported for movement to release the elastic means for springing movement in the film egress direction.

3. A film cartridge comprising a cartridge housing, and a spool rotationally supported inside said cartridge housing to wind a filmstrip including a film leader into the housing, is characterized in that:

propelling means including an elastic member capable of being distorted in a film ingress direction into said cartridge housing, and which recovers an original shape by springing movement in a film egress direction from the housing when released after being distorted, is secured to said cartridge housing, first to engage said film leader as the leader is initially moved in the film ingress direction into the cartridge housing when said filmstrip is wound into the housing and then to be distorted in the film ingress direction from its original shape by the leader further moving into the housing, for propelling said film leader from said cartridge housing solely by springing movement in the film egress direction to recover its original shape when released.

4. A film cartridge comprising a cartridge housing, a spool rotationally supported inside said cartridge housing to wind a filmstrip including a film leader into the housing, and a door that opens to allow said film leader to exit said cartridge housing, is characterized in that:

elastic means capable of being distorted in a film ingress direction into said cartridge housing, and which recovers an original shape by springing movement in a film egress direction from the housing when released after being distorted, is secured to said cartridge housing, first to engage said film leader as the leader is initially moved in the film ingress direction into the cartridge housing when said filmstrip is wound into the housing and then to be distorted in the film ingress direction from its original shape by the leader further moving into the housing, for propelling said film leader from said cartridge housing by springing movement in the film egress direction to recover its original shape when released; and arresting means for holding said elastic means distorted is supported for movement to release the elastic means when said door is opened.

5. A film cartridge as recited in claim 4, wherein said film leader has a perforation, and said elastic means has a free end portion sized to be received in said perforation to engage said film leader.

* * * * *

UNITED STATES PATENT AND TRADEMARK OFFICE
CERTIFICATE OF CORRECTION

PATENT NO. : 5,277,374
DATED : January 11, 1994
INVENTOR(S) : Dennis R. Zander

It is certified that error appears in the above-indentified patent and that said Letters Patent is hereby corrected as shown below:

TITLE PAGE

Abstract, line 1, "ah" should read --an--
Abstract, line 7, "leader, opening" should read --leader. Opening--

Signed and Sealed this

Fourth Day of October, 1994

Attest:

*Attesting Officer*

BRUCE LEHMAN

*Commissioner of Patents and Trademarks*